US006531849B2

(12) United States Patent
Nakamura et al.

(10) Patent No.: US 6,531,849 B2
(45) Date of Patent: Mar. 11, 2003

(54) ALTERNATOR FOR VEHICLES

(75) Inventors: Shigenobu Nakamura, Anjo (JP); Yoshinori Hayashi, Mie-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/899,856

(22) Filed: Jul. 9, 2001

(65) Prior Publication Data

US 2002/0047362 A1 Apr. 25, 2002

(30) Foreign Application Priority Data

Jul. 31, 2000 (JP) ........................................ 2000-230775

(51) Int. Cl.[7] ................................................ F16H 7/02
(52) U.S. Cl. .............................. 322/27; 322/44; 322/17
(58) Field of Search ............................... 322/27, 28, 17, 322/44

(56) References Cited

U.S. PATENT DOCUMENTS 4,242,617 A    12/1980   Jennings ...................... 318/13
4,725,259 A    2/1988    Miyata ......................... 474/70

FOREIGN PATENT DOCUMENTS

| JP | 09133041    | 5/1997  |
| JP | 0871281 A2  | 10/1998 |
| JP | 2000197394  | 12/1998 |
| JP | 11164517    | 6/1999  |

Primary Examiner—Burton S. Mullins
(74) Attorney, Agent, or Firm—Oliff & Berridge, PLC

(57) ABSTRACT

An alternator is provided having a pulley mounted on a rotating shaft of a rotor through a one-way clutch which transmits a driving power to the rotor during acceleration of a crankshaft and does not transmit the driving power to the rotor during deceleration of the crankshaft. The rotor has a plurality of magnetic poles surrounding a field coil, and an alternator control mechanism supplies a predetermined exciting current to the field coil upon sensing engine stop. Noise from the alternator is prevented by reducing the rotating period of the alternator rotor during an engine stop while preventing early breakage or slip noise of the belt during ordinary vehicle driving.

6 Claims, 4 Drawing Sheets

CLUTCH ENGAGEMENT
(DURING ACCELERATION)

CLUTCH IDLING
(DURING DECELERATION)

ALTERNATOR FOR VEHICLES

CROSS-REFERENCE TO RELATED APPLICATION

The present invention is related to Japanese patent application No. 2000-230775, filed Jul. 31, 2000; the contents of which are incorporated herein by reference.

BACKGROUND OF THE INVENTION

1. Field of Invention

The present invention relates generally to a vehicle-mounted alternator, and more particularly, to a vehicle-mounted alternator that has reduced noise.

2. Description of Related Art

In a belt-driven alternator for vehicles, there has been a growing demand for increasing the current output of the alternator in order to meet increased various electric loads adopted for improving driving safety and comfort in a vehicle. As a result, the inertial force of the rotor has been increased with the increased size of the alternator. There is, however, such a problem that since the inertial torque of the rotor is transmitted to the crankshaft during engine deceleration when the vehicle is running, early belt failure and noise caused by belt slippage occurs. To cope with this problem, the use of a pulley with a built-in one-way clutch (hereinafter referred to as the clutch pulley) has been known as disclosed in JP-A No. Hei 7-72585. According to the clutch pulley, the rotational power is transmitted to the alternator when the engine rpm increases, and to the contrary, no inertial torque of the alternator is transmitted to the driving belt when the engine rpms decrease.

On the other hand, for the purpose of environmental protection by reducing exhaust emissions and also as a link of enhancing fuel economy, there has been carried out an effort to stop engines when temporarily stopping a vehicle, particularly a shuttle bus for city driving, at an intersection according to a traffic signal. Also in the case of passenger cars and trucks in general, the adoption of an idle stop system for automatically stopping the engine at an intersection is being contemplated.

When the clutch pulley disclosed in JP-A No. Hei 7-72585 is adopted in the alternator for vehicles, the rotor of the alternator runs idle with its own inertial force for some time even after the engine is decelerated to a stop and disconnected from the alternator rotor by the clutch pulley. During this period, only the rotor of the alternator continues to rotate within the engine compartment. Besides, the rotor rotates with the cooling fan, and generally the rotor of the alternator for vehicles has a Randale-type magnetic pole having a fan effect. When the engine is stopped, engine noise does not occur. So, only such noises like a sound of rotation of the rotor and wind noise made by the cooling fan and the magnetic poles in the engine compartment will be audible and grating to the ear. Futhermore, recent alternators for vehicles are provided with many air vents in the frame for improving cooling performance, and therefore the noise produced by the rotation of the rotor is difficult to reduce and cannot be shielded from the alternator, thus becoming more and more grating to the ear.

Futhermore, if the engine is frequently stopped in urban areas because of the adoption of the idle stop system, noise from the vehicle-mounted alternator will be heard every time the engine is stopped, which will further disturb any listeners, thereby substantially degrading the quality of the vehicle which is required to be pleasant for human senses.

SUMMARY OF THE INVENTION

In view of the above described problem, it is an object of this invention to provide an alternator for vehicles which operates calmly with improved reliability of the driving belt and enhanced fuel economy to improve environmental conditions. More particularly, it is another object of this invention to decrease noise from the alternator for vehicles that are equipped with the idle stop system, while preventing early breakage or slippage noise of the belt by the clutch pulley.

To accomplish the above described object, a first aspect of this invention provides a pulley driven by a belt by the rotation of an engine crankshaft, a rotor connected to the pulley, a stator located opposite the rotor, a ventilating means rotating in one body with the rotor, and a frame with a plurality of cooling air vents as the ventilating means and holding the rotor and the stator. The pulley is mounted on a rotating shaft of the rotor through a one-way clutch which transmits driving power to the rotor during acceleration of rotaional speed of the crankshaft and does not transmit the driving power to the rotor during deceleration of rotational speed of the crankshaft. The rotor has a plurality of magnetic poles surrounding a field coil, and an alternator control mechanism which supplies a predetermined exciting current to the field coil upon sensing an engine stop condition. The rotating period of the alternator rotor during engine stop can be reduced while preventing early breakage and slippage noise of the belt during ordinary vehicle driving. Therefore it is possible to reduce noise from the alternator.

In another aspect, the alternator control mechanism previously stated has an engine stop signal input section, and sets the alternator voltage at a high value upon receiving the signal. It is therefore possible to reduce the idling time of the rotor by supplying the exciting current to the field coil when the engine is stopped.

In another aspect, the alternator for vehicles has a pulley driven by a belt by the rotation of an engine crankshaft, a rotor connected to the pulley, a stator located opposite to the rotor, a ventilating means rotating with the rotor, and a frame with a plurality of colling air vents as the ventilating means and a holding apparatus of the rotor and the stator.

The pulley is mounted on a rotating shaft of the rotor through a one-way clutch which transmits driving power to the rotor during acceleration of rotational speed of the crankshaft and does not transmit the driving power to the rotor during deceleration of rotational speed of the crankshaft.

The rotor has a plurality of magnetic poles surrounding a field coil, and an alternator control mechanism which controls an exciting current supplied to the field coil. The alternator for vehicles is characterized in that the alternator control mechanism has a signal input section, which receives a signal from the engine control mechanism to stop engine rotation upon sensing a vehicle stop, and supplies a predetermined exciting current to the field coil after receiving an engine stop signal from the engine control mechanism.

It is therefore possible to reduce the rotating period of the alternator rotor during engine stoppage and preventing early breakage and slippage noise of the belt in ordinary vehicle driving. Particularly, in the idle stop system, it is possible to decrease noise from the alternator.

In another aspect, the alternator control mechanism sets the alternator output voltage at a high value upon receiving an engine stop instruction signal. It is, therefore, possible to reduce the rotating period of the alternator rotor by supplying the exciting current to the field coil when the engine stops.

In another aspect, the invention has an alternator control mechanism which will stop the exciting current upon sensing a stop of the rotor. Thus it is possible to reduce the rotating period of the alternator rotor and prevent thermal deterioration by maintaining supply of the field current when the rotor is stopped.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF PREFERRED EMBODIMENTS

Figure 1:
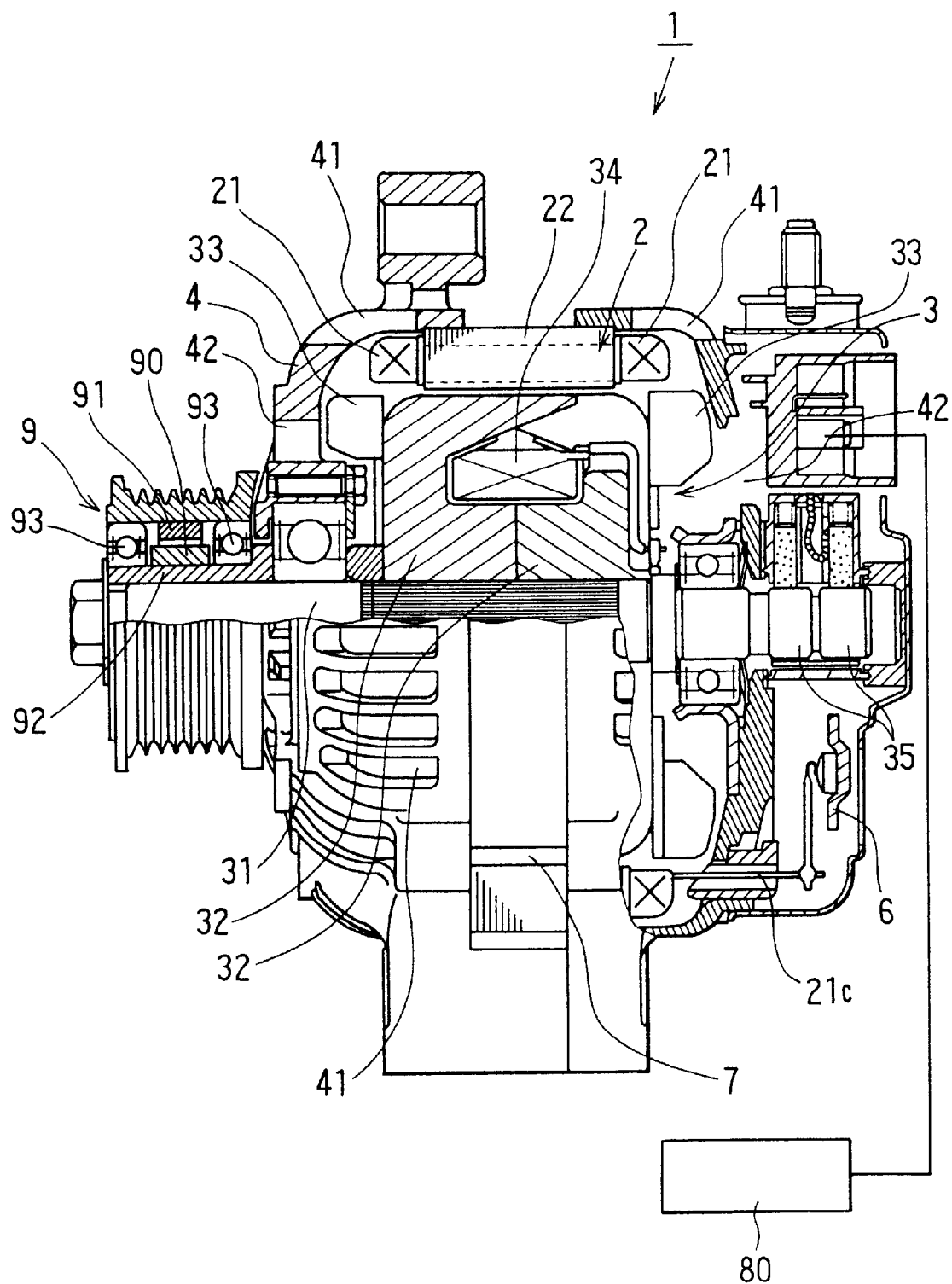
FIG. 1 is a cross-sectional view and a block diagram showing the general constitution of an alternator for vehicles according to this invention.
Figure 2:
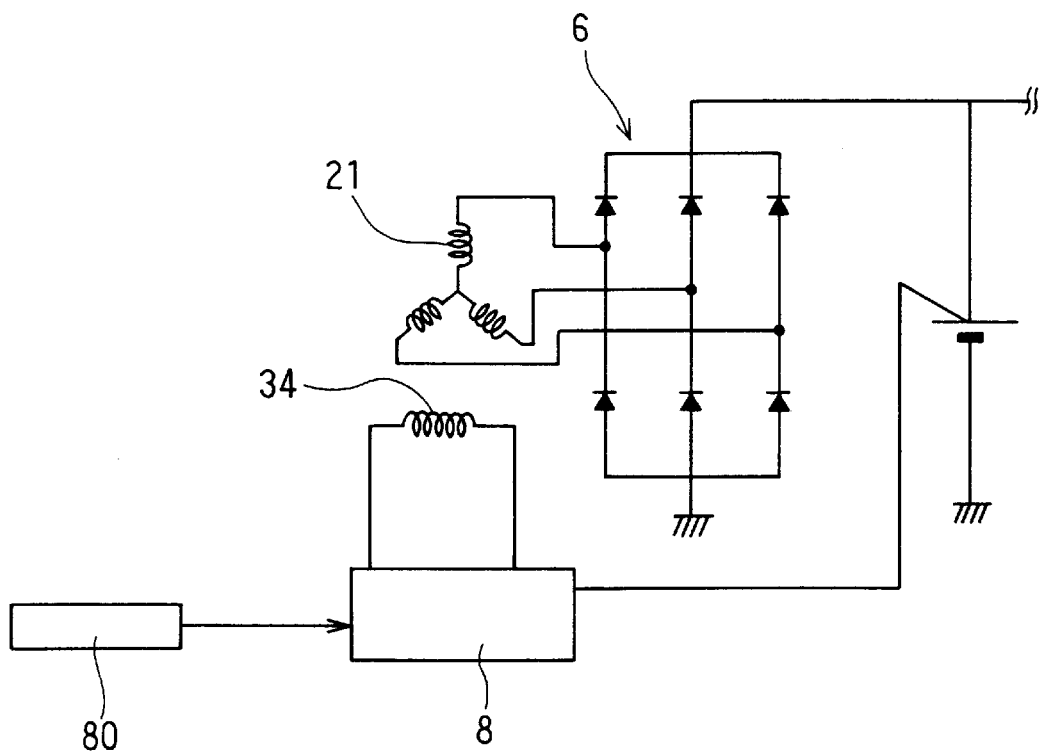
FIG. 2 is a circuit block diagram of the first embodiment.
Figure 3:
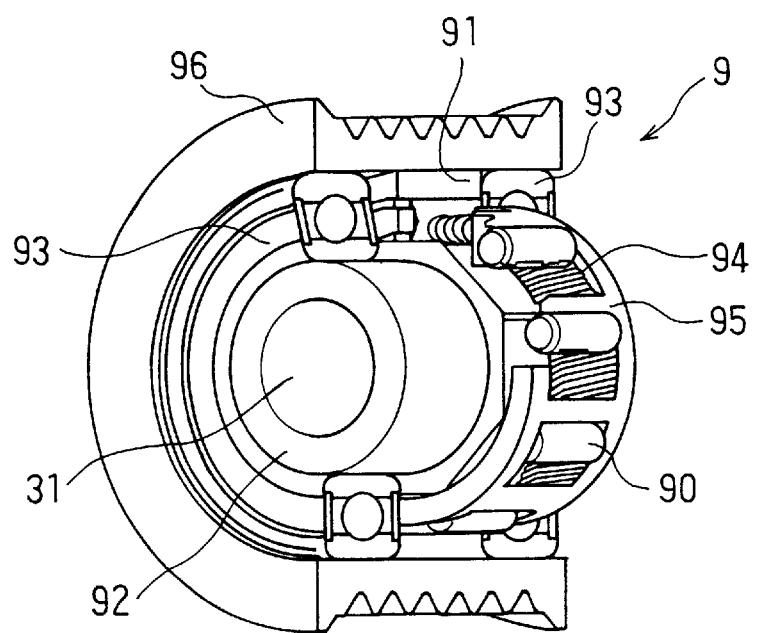
FIG. 3 is a perspective sectional view of a clutch pulley of the first embodiment.

Preferred embodiments of the alternator for vehicles according to this invention will be explained with reference to the accompanying drawings. FIG. 1 is a cross-sectional view showing the general configuration of the alternator for vehicles according to the first embodiment of this invention; FIG. 2 is a circuit block diagram; FIG. 3 is a perspective sectional view of a clutch pulley; FIG. 4 is a view explaining operation of the clutch pulley; and FIG. 5 is an explanatory view of a difference between this invention and conventional one, explaining rotor speed variations before and after stopping of the engine.

The alternator 1 for vehicles is of such a design that the power from the engine is transmitted to the clutch pulley 9 by a belt (not shown), thereby turning the rotor 3 fixed on the clutch pulley 9 through the shaft 31. In this state, as the exciting current is supplied to the field winding 34 of the rotor 3 through the slip ring 35, the N and S poles are formed in the pole core 32, thus enabling generation of the ac voltage in the stator winding 21 and transmission of the dc current through the rectifier 6 connected to the output end 21c of the winding. The amount of electric power to be generated is regulated by the regulator 8 which controls the exciting current flowing in the field winding 34 shown in FIG. 2. The rotor 3 and the stator 2 are oppositely arranged on a pair of frames 4, while the stator 2 is being held by a plurality of bolts 7 between the frames 4. Cooling air is drawn in through the opening 42 in the axial direction of the frame 4 by means of the cooling fans 11 and 12 secured on the pole cores 71 and 72. It is discharged at the opening 41 in the radial direction.

In the clutch pulley 9, as shown in FIG. 3, a plurality of clutches 90 are disposed between an outer race 91 and an inner race sleeve 92. The clutches 90 are arranged and supported at a nearly equal pitch in the circumferential direction by a holder 95 and a spring member 94. The outer race 91, fixed by pressing it into the inner periphery of the pulley 96, turns as one unit with the pulley 96, while the inner race sleeve 92 rotates as one unit with the shaft 31.

Figure 4A:
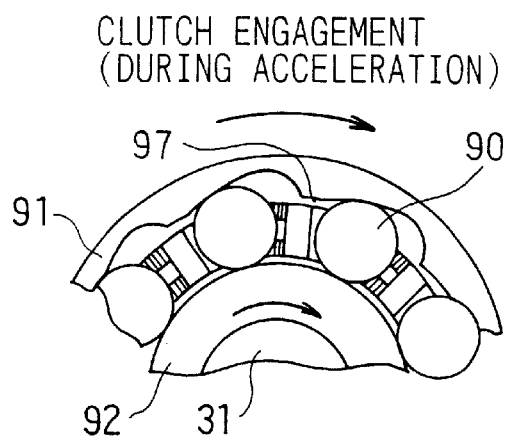
FIG. 4A is a schematic view showing the operation of the clutch pulley during engine acceleration in the first embodiment.
Figure 4B:
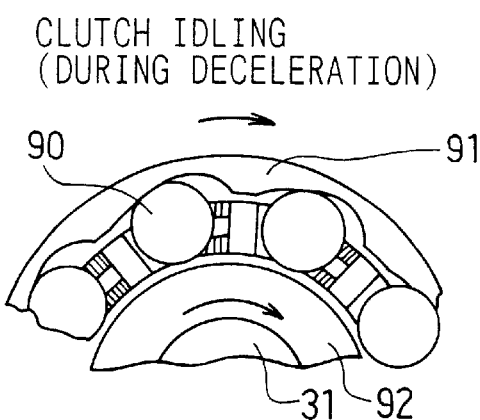
FIG. 4B is a schematic view explaining the operation of the clutch pulley during engine deceleration in the first embodiment.
Figure 5:
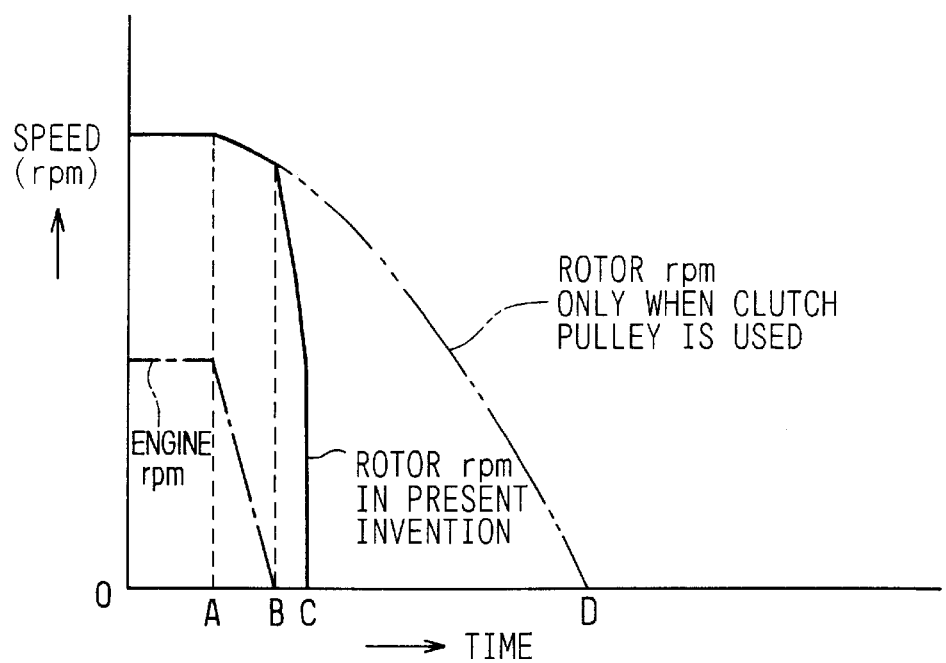
FIG. 5 is a graphical view showing a difference in variation of rotor rpm between before and after an engine stop in the first embodiment.

FIG. 4A shows the outer race 91 and the inner race sleeve 92 during engine acceleration, and FIG. 4B shows the outer race 91 and the inner race sleeve 92 during engine deceleration. As shown in FIG. 4A, the clutch 90 is meshed with the lock portion 97 of the outer race 91 during engine acceleration, the rpm of the pulley 96 becoming equal to the rpm of the shaft 31. On the other hand, during engine deceleration, the clutch 90 is disengaged from the lock portion 97 as shown in FIG. 4B, and turns idle. Accordingly, the rpm of the shaft 31 is slowly decreased at higher rpm than the rpm of the pulley 96 by the inertial force of the rotor 3, although the rpm of the pulley 96 follows the rotation of the engine.

Figure 4C:
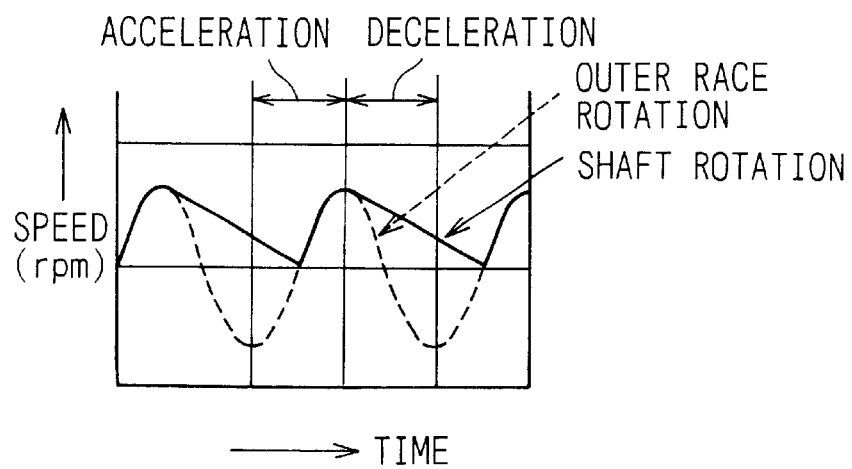
FIG. 4C is a graphical view showing an outer race and a shaft rotating during acceleration and deceleration.

FIG. 4C is a view showing the rotation of the outer race 91 and the shaft 31 during acceleration and deceleration of the engine. When the engine is under acceleration, the rpm of the outer race 91 increases in synchronization with the increase of the engine rpm. When the rpm of the outer race 91 exceeds the rpm of the shaft 31, the clutch 90 fits in the lock portion 97, causing the outer race 91 to turn as one unit with the shaft 31.

During engine deceleration, the speed of the outer race 91 decreases synchronously with the decrease in engine rpm. On the other hand, the speed of the inner race sleeve 92 is slowly decreased during engine deceleration because of the inertial force. Therefore, the speed of the shaft 3 rotating as one unit with the inner race sleeve 92 decreases more slowly than the speed of the outer race 91.

FIG. 5 is a view showing a variation in rotor rpm before and after the engine stops. As shown in FIG. 5, when the engine stops, the clutch idles. Therefore, between A and B in the drawing, the rpm of the rotor 3 makes a slow decrease due to the inertial force like during deceleration. And at the point B where the engine rpm reaches zero, the regulator 8 shown in FIGS. 1 and 2 receives an engine stop signal from a sensor mechanism 80. Upon receiving the signal, the regulator 8 operates to supply the exciting current to the field coil 34. Therefore, the inertial force of the rotor 3 is consumed by the driving torque, and accordingly the rpm of the rotor 3 suddenly lowers as low as point C. If exciting current is not supplied, the inertial force of the rotor 3 is consumed by rolling friction of bearings and the rotational energy of the fans. Thus the rpm of the rotor slowly decreases as indicated by a two-dot chain line in FIG. 5, reaching the point D, at which the rotor comes to a stop.

In ordinary vehicle driving, therefore, when the engine is decelerated, the clutch pulley is disconnected so as not to transmit the inertial force of the alternator rotor to the pulley. Early breakage of the belt or slip noise of the belt can be prevented. And, it is also possible to quickly stop the alternator rotor when stopping the engine, to thereby reduce noises from the alternator.

[Other Embodiments]

Figure 6:
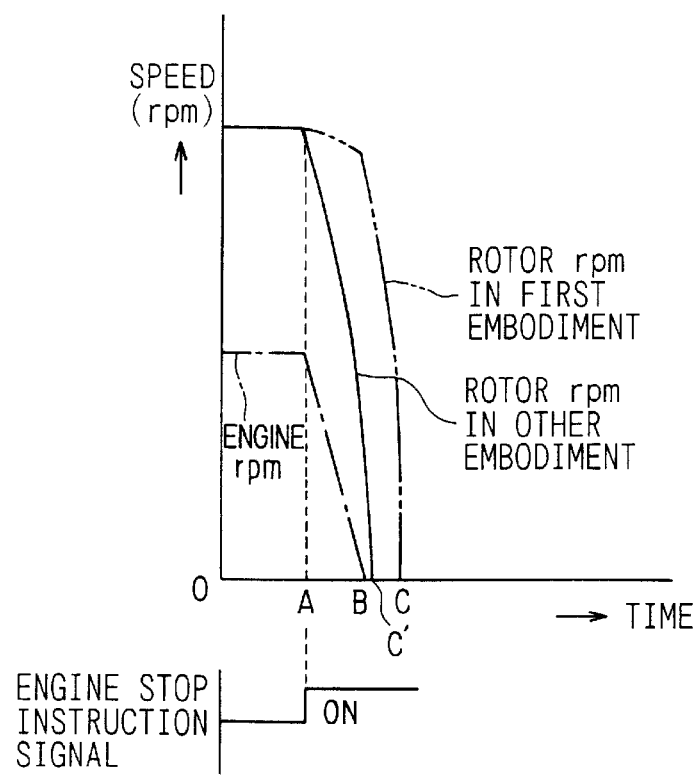
FIG. 6 is a graphical view showing a difference in variation of rotor rpm between before and after an engine stop in the first embodiment and other embodiments.

In the first embodiment the exciting current was supplied upon sensing the decrease of engine rpm to zero. It should be noticed, however, that a signal may be received directly from a control mechanism which stops the engine upon sensing a vehicle stop, and then, as shown in FIG. 6, the exciting current may be supplied in synchronization with the transmission of an engine stop instruction signal. In this case, since the alternator rotor can be more quickly stopped, it is possible to further reduce noises from the alternator. The effect of noise reduction can be improved particularly by combining the alternator with the idle stop system.

Furthermore, it becomes possible to quickly stop the alternator rotor by supplying the exciting current through the control to set the regulated voltage of the alternator at a high value when the engine stop signal is received.

Furthermore, it becomes possible to prevent thermal deterioration caused by the rise of field coil temperature, by combining with the alternator control mechanism which stops the supply of the exciting current upon sensing an alternator rotor stop. For sensing the rotor stop, it is enough to sense for example the presence or absence of one-phase voltage. The time to stop the exciting current may be preset in accordance with the inertial moment of the rotor.

Furthermore, the clutch pulley in the first embodiment has a combination of a roller-type clutch, a spring member, a holder, an outer race, and an inner race sleeve, but may be of other constitution if provided with a one-way clutch function. Furthermore, an electromagnetic clutch may be used.

Furthermore, the first embodiment shows the rotor having cooling fans on both sides in the axial direction. But if there is space for air cooling, for example because of the adoption of water cooling, the cooling fan may be mounted on only one side, or the magnetic pole rotating without a cooling fan may be used in place of the fan.

While the above-described embodiments refer to examples of usage of the present invention, it is understood that the present invention may be applied to other usage, modifcations and variations of the same, and is not limited to the disclosure provided herein.

What is claimed is:

1. An alternator for a vehicle having a pulley driven by an engine crankshaft through a belt, a rotor being connected to the pulley, a stator located opposite to the rotor, a ventilating means rotating as one body with the rotor, and a frame with a plurality of cooling air vents as the ventilating means, the frame holding the rotor and the stator, comprising:

the pulley mounted on a rotatable shaft of the rotor by a one-way clutch that transmits driving power to the rotor during acceleration of the crankshaft and does not transmit driving power to the rotor during deceleration of the crankshaft; and the rotor having a plurality of magnetic poles surrounding a field coil, an alternator control mechanism supplying a predetermined exciting current to the field coil upon sensing engine stop.

2. An alternator for a vehicle according to claim 1, wherein the alternator control mechanism has an engine stop signal input section that sets an output voltage of the alternator at a higher level upon receiving the signal.

3. An alternator for a vehicle having a pulley driven by an engine crankshaft through a belt, a rotor being connected to the pulley, a stator located opposite the rotor, a ventilating means rotating as one unit with the rotor, and a frame with a plurality of cooling air vents as the ventilating means, the frame holding the rotor and the stator, comprising:

the pulley mounted on a rotatable shaft of the rotor by a one-way clutch which transmits driving power to the rotor during acceleration of the crankshaft and does not transmit driving power to the rotor during deceleration of the crankshaft;

the rotor having a plurality of magnetic poles surrounding a field coil; and an alternator control mechanism which controls an exciting current supplied to the field coil, the alternator control mechanism having a signal input section which receives a signal from the engine control mechanism to stop the engine rotation upon sensing a vehicle stop, the alternator control mechanism supplying a predetermined exciting current to the field coil after receiving an engine stop signal from the engine control mechanism.

4. An alternator for a vehicle according to claim 3, wherein the alternator control mechanism sets an output voltage of the alternator at a higher level upon receiving an engine stop instruction signal.

5. An alternator for a vehicle according to claim 4, wherein an alternator control mechanism which reduces the exciting current to zero upon sensing a stop of the rotor is provided.

6. An alternator for a vehicle according to claim 1, wherein an alternator control mechanism which reduces the exciting current to zero upon sensing a stop of the rotor is provided.

* * * * *